United States Patent [19]
Zeger

[11] 3,967,279
[45] June 29, 1976

[54] SELF-PHASING ARRAY WITH A TIME-SHARED PROCESSOR

[75] Inventor: Andrew E. Zeger, Wyndmoor, Pa.

[73] Assignee: The Magnavox Company, Fort Wayne, Ind.

[22] Filed: Oct. 30, 1973

[21] Appl. No.: 411,103

Related U.S. Application Data

[63] Continuation-in-part of Ser. No. 95,782, Dec. 7, 1970, abandoned.

[52] U.S. Cl. .................. 343/117 A; 343/100 SA; 343/100 TD; 343/854
[51] Int. Cl.² .................. G01S 3/44; H01Q 3/26
[58] Field of Search ............. 343/100 TD, 100 SA, 343/117 A, 17.7, 854, 703

[56] References Cited
UNITED STATES PATENTS

| | | | |
|---|---|---|---|
| 3,036,210 | 5/1962 | Lehan et al. ........................ | 250/6 |
| 3,056,961 | 10/1962 | Mitchell ............................ | 343/854 |
| 3,370,267 | 2/1968 | Barry .............................. | 343/100 SA |
| 3,378,846 | 4/1968 | Lowenschuss ...................... | 343/703 X |
| 3,531,803 | 9/1970 | Rosen et al. ...................... | 343/100 SA |
| 3,757,333 | 9/1973 | Procopio .......................... | 343/100 SA X |

OTHER PUBLICATIONS

Henry Richter, "Microlock," QST., Dec. 1957, pp. 20-24.

*Primary Examiner*—Maynard R. Wilbur
*Assistant Examiner*—Richard E. Berger
*Attorney, Agent, or Firm*—Thomas A. Briody; William J. Streeter; Joe E. Barbee

[57] ABSTRACT

A phase alignment system for a self-phasing antenna array is described. A single time-shared processor sequentially phase aligns each array element with a suitable reference signal. This technique is applicable to a self-phasing array in which the random phase of the signal received at each array element is slowly varying (bandlimited). Individual antenna signals are summed and the phase of the signal from a selected one of those antennas is compared to the phase of the sum (reference) and a variable phase shift is introduced into that selected one antenna output to bring that output into closer conformity with the phase of the sum. This process is repeated sequentially for the entire group of antennas and optionally the sequential comparing and adjusting may be interrupted, maintaining the phase-shifts for the several antennas at their most recent value, and the antenna array employed for a transmitter to thereby provide a transmission radiation pattern substantially the same as the reception sensitivity pattern as it existed just prior to the interruption.

12 Claims, 4 Drawing Figures

3,967,279

SELF-PHASING ARRAY WITH A TIME-SHARED PROCESSOR

This is a continuation-in-part of application Ser. No. 95,782, filed Dec. 7, 1970, now abandoned.

BACKGROUND OF THE INVENTION

This invention relates generally to adaptive antenna systems which, for example, could be used to track moving objects. The classic and well known approach to this tracking problem is to provide a dipole antenna in combination with a parabolic reflector and to mechanically rotate this combination to scan the relevant portion of space. Such mechanical scanning schemes have a number of obvious drawbacks. Scan rate is inherently slow. The apparatus is generally bulky. The mechanical drive arrangement may introduce inaccuracies, is subject to wear and impaired operation during inclement weather, and does not physically conform to the surface on which it is mounted, thus requiring a radome covering for aircraft installation thereby impairing aerodynamic performance.

A substantial improvement over the mechanically driven antenna arrangement is represented by U.S. Pat. Nos. 3,036,210 to Lehan et al. and 3,251,062 to Ghose which disclose an electronically scanning antenna employing plural phase locked loops to produce optimum directivity. While the Lehan et al. patent represents a substantial improvement over the previous prior art, it involves an extensive and rather complex electrical system for even a very small number of antenna elements.

SUMMARY OF THE INVENTION

The present invention represents a substantial improvement over the aforementioned prior art devices in that the major portion of the electrical circuitry is time-shared by the several antenna elements regardless of the number of antenna elements present.

Accordingly, it is one object of the present invention to provide a more economical electronically rotatable signal seeking and tracking system.

It is a further object of the present invention to provide a self-phasing antenna array employing a single time-shared processor.

It is another object of the present invention to substantially reduce the weight, power consumption, cost and size of an electronically scanning antenna system.

These and other objects and advantages are achieved in the present invention by providing but a single signal processor unit which is time-shared by the several antenna elements in the array.

It is therefore a salient object of the present invention to achieve all of the results of the aforementioned prior art patents by employing a single phase locked loop to produce optimum directivity.

DESCRIPTION OF THE PREFERRED EMBODIMENT

Figure 1:
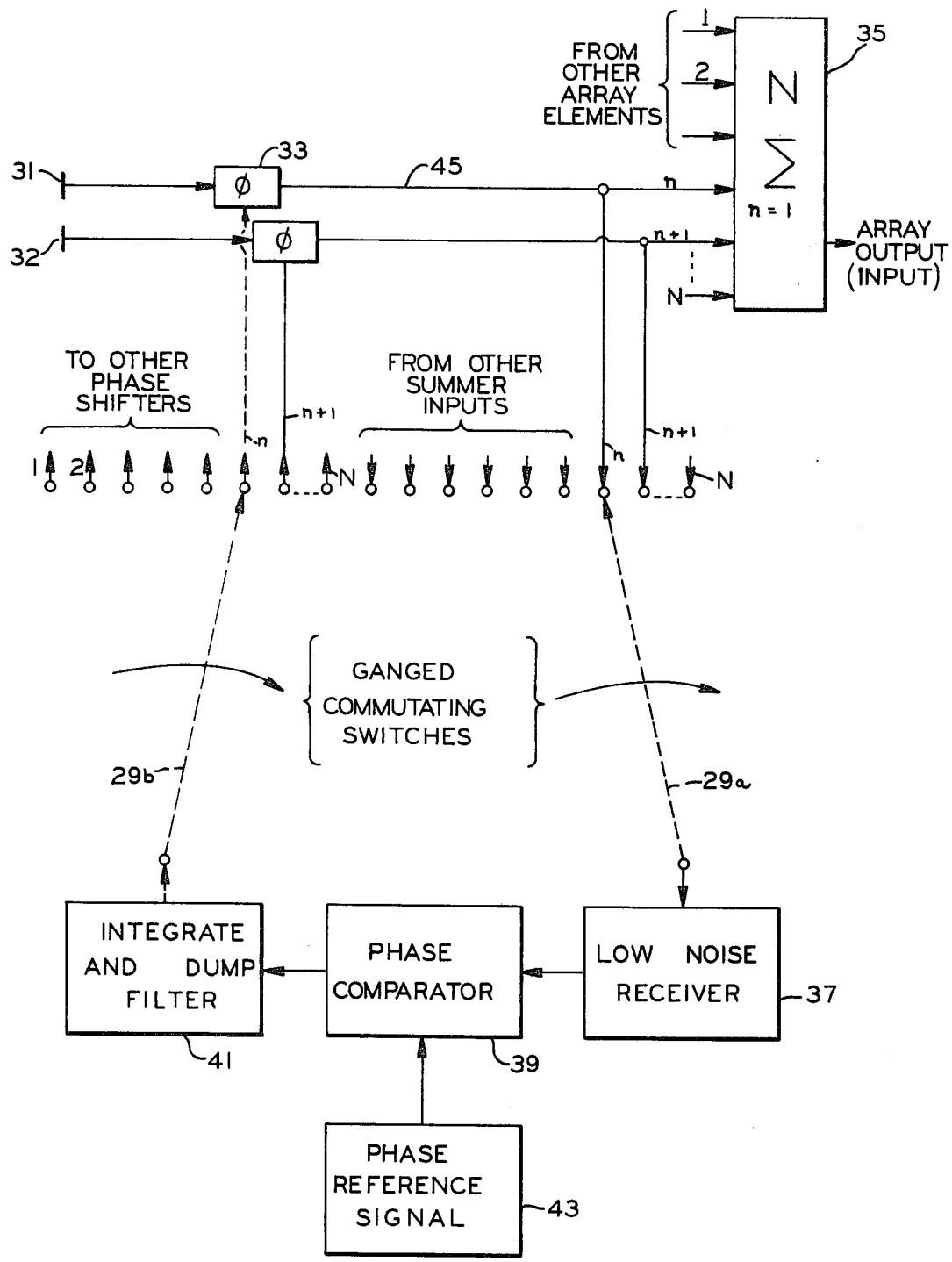
FIG. 1 is a block diagram of an electronic antenna scanning system according to the teachings of the present invention.

Turning now to the block diagram of FIG. 1, a plurality of antenna elements . . . , 31, 32, . . . form an antenna array. The signals from one or more of the elements within this array are selectively sampled by the commutator 29a and the thus sampled signal is fed to a radio frequency low noise receiver or amplifier 37. The output of this radio frequency stage is supplied to a phase comparator 39. A reference signal applied to the terminal 43 may be a similarly processed output signal from another of the antenna elements 31, 32, it may be derived from a signal received on a common omnidirectional antenna, it may be an internally generated signal within the processor, or it may be the coherent sum output of the antenna array. The phase of the reference signal applied to terminal 43 is compared to the phase of the output signal at the terminal 37 by a phase comparator 39. The results of this phase comparison are passed through an integrate and dump filter 41 and into phase control circuitry 33 somewhat in accordance with the teachings in the aforementioned Lehan et al. patent.

In FIG. 1 a pair of rotary ganged switches 29a and 29b are illustrated as being positioned on the nth contact position of N contacts to illustrate the principle of the present invention, however, it will become clear subsequently that single pole N throw electronic switching means would actually be preferred. The nth antenna array element 31 and the $(n+1)$th element 32 are the only antenna elements illustrated, however, it will be understood that each of the N array elements would have its output passed through a controlled latching phase shifter, like phase shifter 33 to the N inputs of the coherent summer 35.

The time-shared processor portion of the system illustrated in FIG. 1 comprises a low noise receiver 37, phase comparator 39, integrate and dump filter 41, and a source 43 of a phase reference signal which may be the output of the summer 35. In operation, the system of FIG. 1 couples a portion of the phase shifted antenna element signal on transmission line 45 through the low noise receiver 37 and to the phase comparator 39. This comparator also receives a phase reference signal 43 such, for example, as the output of the summer 35 and provides as its output a signal indicative of the phase difference modulo $2\pi$ between these two input signals. The integrate and dump filter integrates the phase comparator output for a short period of time to suppress receiver noise and employs the resultant to set the angle of phase shift of the phase shifter 33 at a preferred value to bring the signal on line 45 into closer phase alignment with the reference signal. The phase shifter 33 then maintains that preferred angle of phase shift until receiving a further "error" value from the integrator 41. At this time the commutating switches 29a and 29b increment to the $(n+1)$th position and the integrator is cleared to receive a new value indicative of the difference in phase of the reference signal and the shifted output from the $(n+1)$th antenna element.

Figure 2:
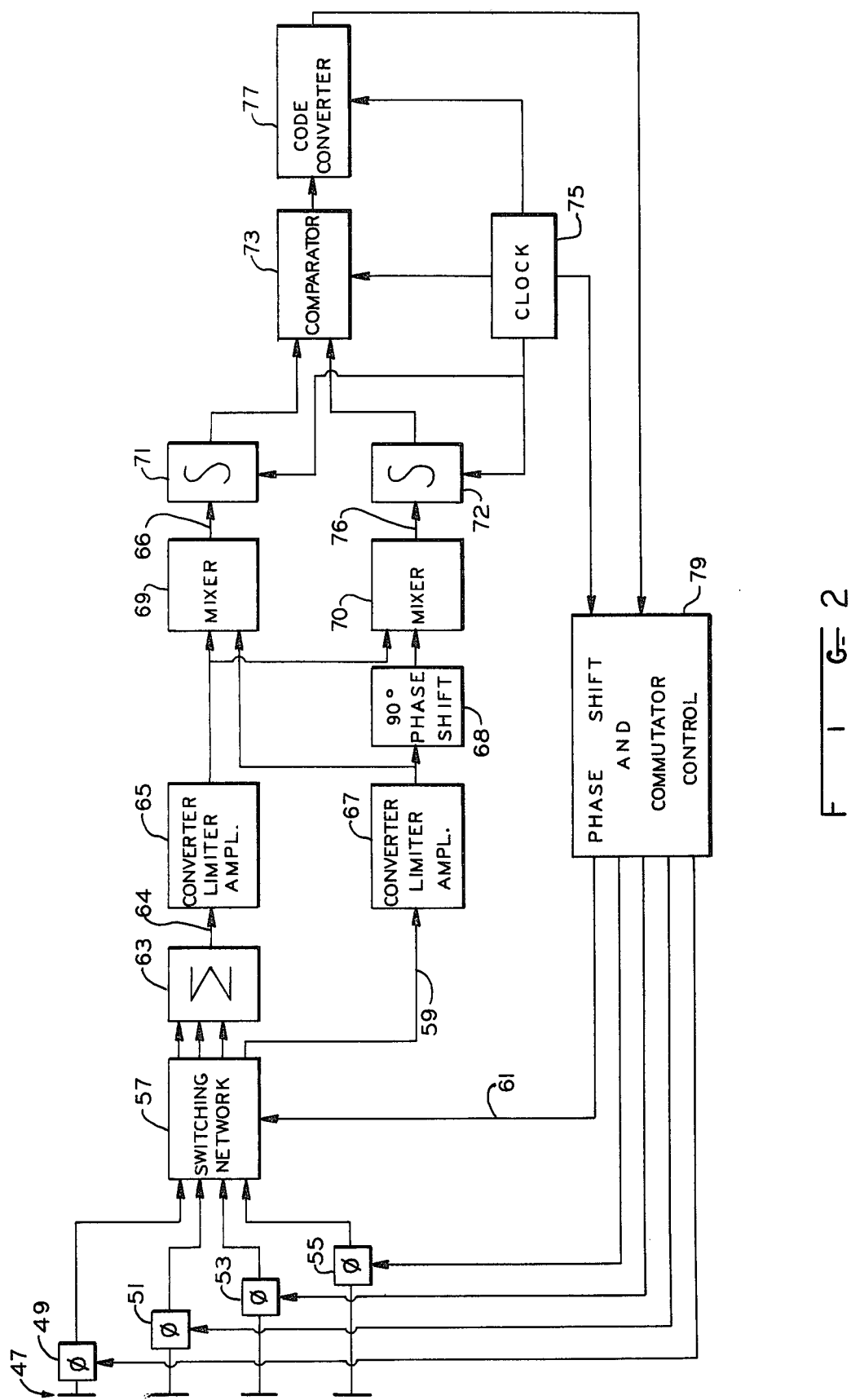
FIG. 2 is a generalized block diagram of a more sophisticated version of the antenna system of FIG. 1.

Turning now to the block diagram of FIG. 2 which employs basically the same principles as discussed in conjunction with FIG. 1, however, substituting electronic switching circuitry for the ganged commutating switches, the input will be seen to be an array 47 which is assumed for the sake of discussion to comprise four antenna elements. Individual lines from these antenna elements pass through individual radio frequency (RF) phase shifting circuit 49, 51, 53 and 55 the outputs of which are passed through a switching network 57 which basically functions to extract a given one of the antenna element signals on transmission line 59 in accordance with the instructions received on control line 61 while passing the remaining three antenna element signals to the summer 63. Dual receiver channels now perform basically the same function to the summer output 64 and the separated out (sample) individual array signal 59. Both sum and sample signals are down converted, amplified and band limited in convertors 65 and 67. The two signals are then appropriately mixed by mixers 69 and 70 to provide output signals representing the in phase 66 and quadrature 76 components of the sample signal on line 59 relative to the output of the summer. These in phase and quadrature components are integrated in integrators 71 and 72 and the two integrals compared by digital comparator 73 to provide a digital output signal indicative of the modulo $2\pi$ phase difference between the two signals. Timing for the system is derived from clock 75 which, of course, periodically dumps the values in the integrators 71 and 72 and otherwise gates the digital information through digital code convertor 77 and phase shift and commutating control circuitry 79 back to control the RF switching network 57 and the several phase shifters 49, 51, 53 and 55.

The mixing of the output signals from amplifiers 65 and 67 would, of course, result in identical outputs from the mixers 69 and 70 were it not for the presence of a 90° phase shift circuit 68 in the sample line to the mixer 70.

If we assume the reference signal from amplifier 65 is $E_1 \sin wt$ then the sample signal from amplifier 67 can be represented as $E_2 \sin (wt + \theta)$ and mixer 69 provides as an output $E_1 E_2 \sin wt \sin (wt + \theta) = \frac{1}{2} E_1 E_2 [\cos \theta - \cos(2wt + \theta)]$ where $\theta$ is the phase difference between the signals. Integrator 71 operates over hundreds or more cycles of the sine wave, hence its output is essentially proportional to $\cos \theta$. Similar analysis shows the output of mixer 70 to be $\frac{1}{2} E_1 E_2 ]\sin \theta + \sin (2wt + \theta)]$ and integrator 72 will provide an output proportional to $\sin \theta$. Thus the output of integrator 71 is considered to be proportional to the in phase component of the sampled signal relative to the reference signal whereas the output of integrator 72 represents the quadrature component of the sample relative to the reference. The comparator 73 may compare these quadrature and in phase components in any desired ratio to determine the value of $\theta$ to a high degree of accuracy. The comparator 73 may, for example, provide an output signal indicating no further phase correction is needed when the in phase component is more than double the quadrature component, however, any other criteria might be set up depending on the number of discrete possible phase shifts in the phase shift circuits, 49, 51, 53 and 55.

Figure 3A:
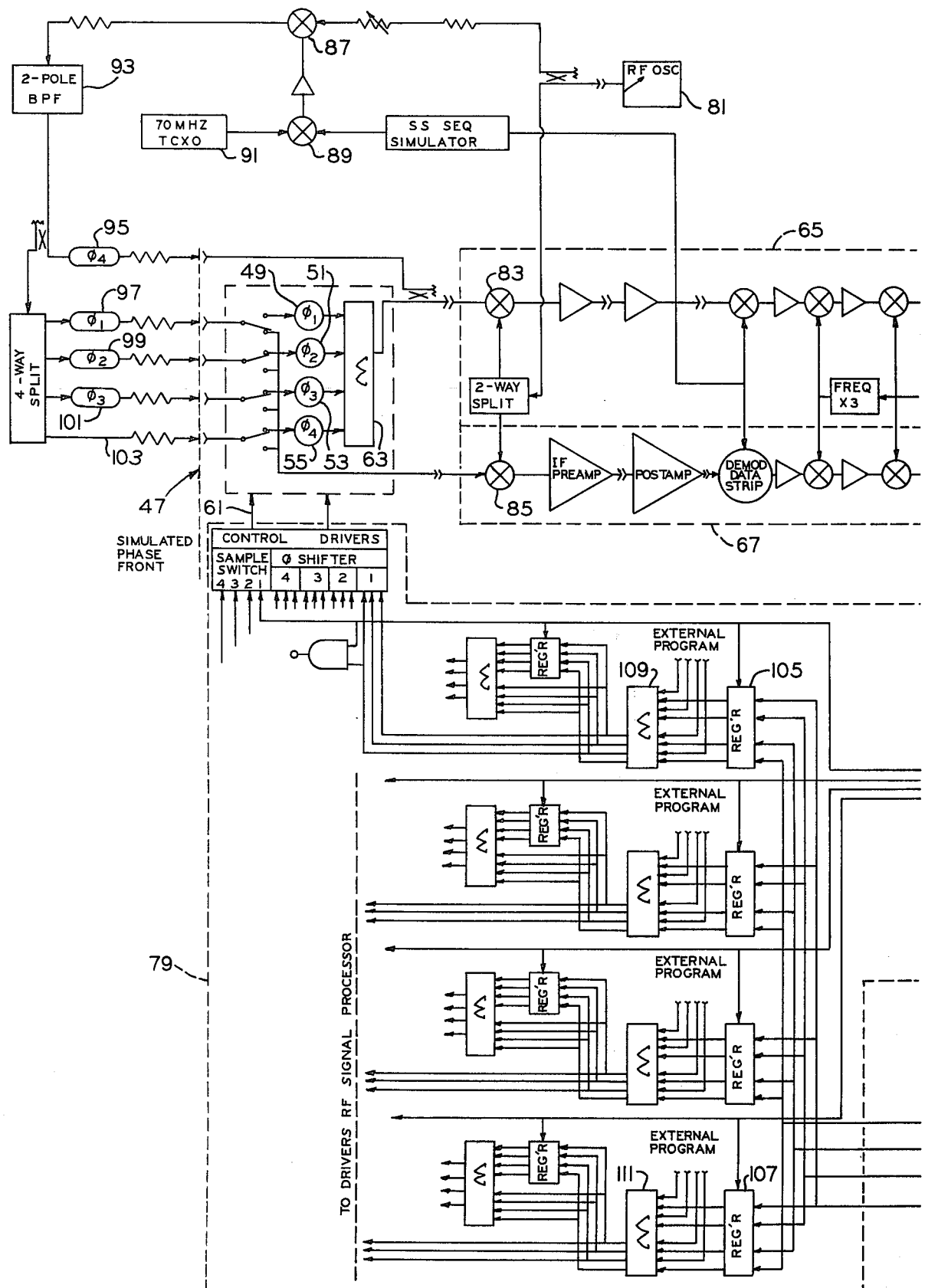
FIGS. 3a and 3b taken together comprise a schematic diagram of a four element prototype array according to the present invention including means for simulating an array with an arbitrarily large number of antenna elements.
Figure 3B:
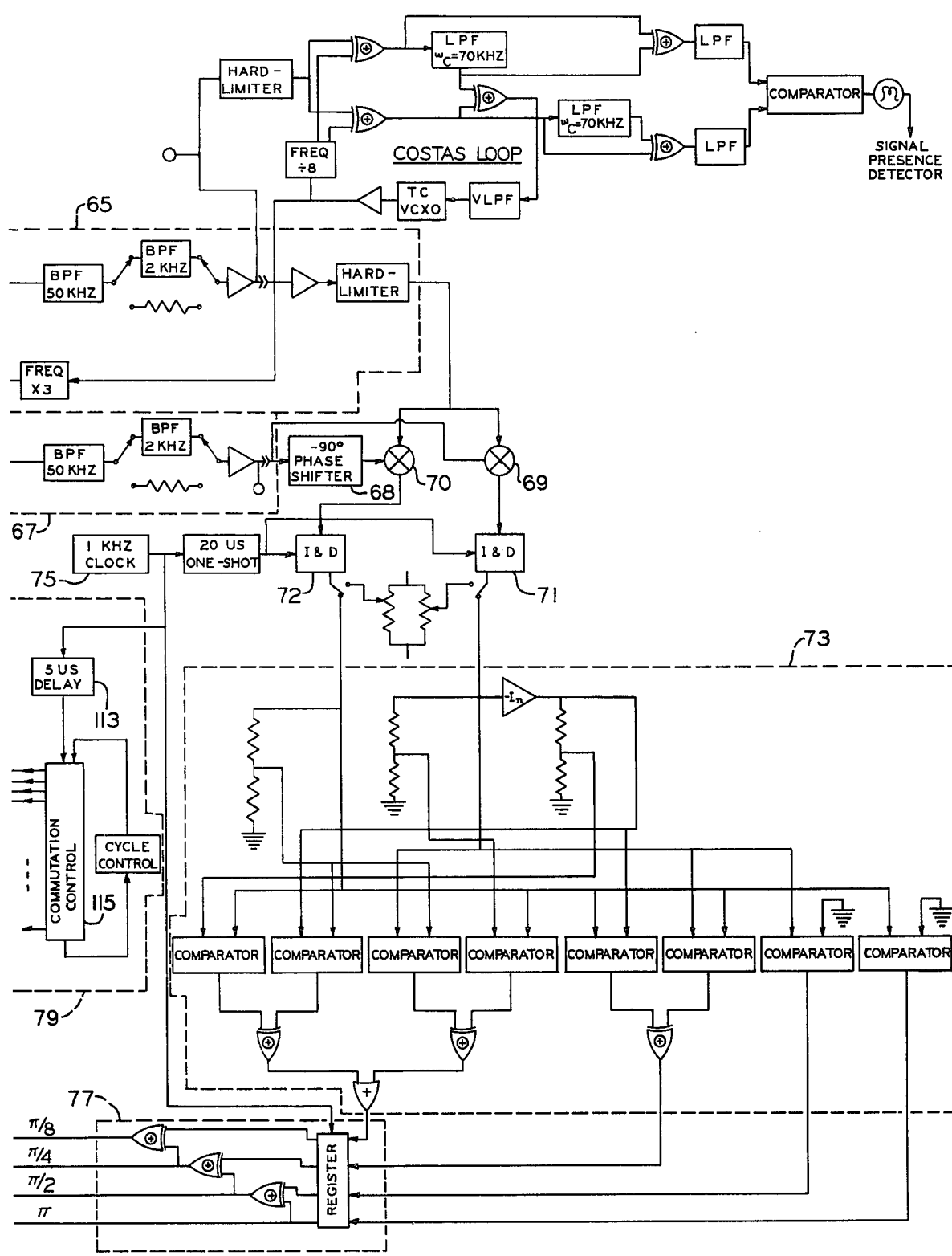

These phase shifters along with the other components of the block diagram of FIG. 2 are illustrated in greater detail in FIGS. 3a and 3b with like elements bearing the same reference numeral or a number of elements enclosed within dotted lines bearing that same reference numeral. The system illustrated in FIGS. 3a and 3b was actually employed to test a four element self-phasing array and additionally to simulate a larger number of antenna elements while only sampling and processing signals for four such elements.

In addition to detailing several of the elements of FIG. 2, FIGS. 3a and 3b further include a radio frequency incident wavefront simulator to test the self-phasing array. Oscillator 81 supplies a local oscillator signal to the down converting mixers 83 and 85 and also supplies a substantially attenuated portion of the signal to the frequency translator 87. This frequency translator shifts the radio frequency signal by, for example, 70 MHz and by way of modulator 89 may also be employed to impress modulation information on the 70 MHz from the signal generator 91. After filtering in band pass filter 93, the output of the frequency translator 87 is used to simulate an incoming radio frequency signal at SHF such as might be received from a transmitter aboard a satellite. This simulated radio frequency signal wavefront is "steered" by way of manually adjustable phase shifters 95, 97, 99 and 101 to the points in the circuit normally associated with the antenna array. Of these phase shifters 97, 99 and 101 in conjunction with the unshifted signal on line 103 represent four antenna inputs while the remaining output of phase shifter 95 may represent any remaining number N-4 of antenna inputs which are, of course, assumed to already be in phase alignment with the signal from phase shifter 95. The amplitude of this N-4 component is adjustably attenuatable relative to the magnitudes of the four other input signals so as to simulate different numbers of antenna elements.

Control signals on line 61 determine which of the four antenna input signals will be selected as the sample the phase of which is to be adjusted and the remaining three signals will be passed through their respective phase shifters into the summer 63 and thereafter combined with the N-4 other antenna element signals to be downshifted, limited, and amplified by the circuitry enclosed in the dotted line 65. In FIGS. 3a and 3b, the signal sampling takes place prior to RF phase shifters 49, 51, 53 and 55, in order to avoid degradation of phase shifter control due to loss of signal through attenuation in the RF phase shifters. Insertion loss in SHF phase shifters of the diode and ferrite type are typically 2 db and 1 db respectively. The sample signal, of course, receives the same conversion, limiting and amplification in the circuitry enclosed by the dotted line 67. Mixing and integrating to provide in phase and quadrature components for comparison occurs as in the circuitry in FIG. 2 and with the particular phase comparison circuit illustrated in FIG. 3b, a gray code results as the comparator output. This particular comparison circuit then requires a gray to binary convertor 77, however, it will be understood that other comparators not requiring such a code conversion are within the scope of the present invention.

The binary code indicative of the difference between normal and quadrature components of the sampled signal relative to the sum are supplied to several registers such as 105 and 107 within the phase shift and commutation control area and provision is made for experimental external programmed supplementing of this binary information by inserting additional digits representing quantized phase shifts in summers such as 109 and 111. Further additional input information for test purposes may be supplied to the additional summers illustrated and the output of these summers used to control the setting of the preferred phase shift angle for phase shifters 49, 51, 53 and 55. Timing for the commutation control and setting of the phase shift angles is provided from the clock 75 by way of a delay circuit 113 to a commutation control shift register 115. As illustrated, this register is capable of providing 16 different sample signals only four of which are illustrated in the other portions of the equipment. For example, one millisecond sampling once every 16 milliseconds may be provided by the commutation control register 115. Also, as illustrated, the controllable phase shifters may be latched at phase shift increments which are integral multiples of $\pi/8$.

The RF phase shifters can adjust phase continuously or discretely in quantized steps and they can operate reciprocally on signals arriving from either direction or unidirectionally. In the preferred embodiment, bidirection phase shifters were selected to permit simultaneous transmit-receive operations. Quantized phase shifters were selected on the basis of lower cost. The phase shift levels $\pi/8$ radians apart result in an average loss of array gain of only 0.2 db. The demonstration model of the self-phasing array was equipped with diode phase shifters 49, 51, 53 and 55 of the loaded-line type for lowest cost and smallest size. Ferrite phase shifters having 1 db lower insertion loss could have been employed but at high cost and greater size and weight.

A "long" Costas data and carrier tracking loop was used to coherently track the sum signal at IF, to demodulate the biphase digital data, to compensate for carrier frequency drift, and to provide common coherent local oscillator signals to the sum and sample convertors 65, 67. The "dirty data" from the Costas loop also provided a signal presence indication (light bulb) which aided testing although the Costas loop lock on threshold proved lower than the acquisition threshold of the time-shared self-phasing array. An IF band pass filter of the loop was switched to 2 KHz bandwidth for acquisition and to 50 KHz for the track mode during biphase data transmission.

The elimination of the requirement for one phase alignment processor at each array element is of practical importance. It makes use of self-phasing arrays having many elements feasible in terms of cost, size, weight, and prime power consumption. This multi-signal processor consists of dual RF receivers and IF strips, a phase comparator, lowpass filter, phase control circuits, and commutation switches. Important application areas for this self-phasing array are retrodirective radar and radio communications.

The system may be analyzed by comparison with self-phasing arrays which have separate phase alignment processors for each element in the array in the following manner. Antenna performance in noise is compared with self-phasing arrays that use a separate phase alignment processor for every array element. The phase alignment error is expressible in terms of the received signal-to-noise ratio, the bandwidth of the random phase of the signal, and the number of elements in the self-phasing array that are aligned by a single time-shared processor. The total mean-square phase alignment error $$(\sigma^2_{Total})$$

is the sum of the mean-square phase error $$(\sigma^2_{Track})$$

due to imperfect tracking of changes in the incident phase front and the mean-square phase error $$(\sigma^2_{Noise})$$

due to additive thermal noise existing at the output of the integrate and dump filters. Mathematical analysis has shown that:

$$\sigma^2_{Track} = (N+1)(t_1/T)\sigma_\phi^2$$

$$\sigma^2_{Noise} = N_o/(2 C_e t_1)$$

where:
$t_1$ = phase alignment time per element
$T$ = correlation time of random incident phase front
$\sigma_\phi^2$ = mean-square phase error if no phase correction was performed
$N_o$ = noise spectral density (watts/Hz)
$C_e$ = received signal power at each array element.

The total mean-square phase alignment error is minimized when $t_1$ is selected to make $\sigma$ Noise = $\sigma$ Track. In this case:

$$\sigma^2_{Total\ (Minimum)} = \sqrt{\frac{2(N+1)N_o}{C_e T}}\sigma_\phi$$

when $$t_1 = \frac{N_o T}{2 C_e (N+1)\sigma_\phi^2}$$

An embodiment of the present invention constructed in accordance with FIGS. 3a and 3b has demonstrated the capability of acquiring a 1 MHz biphase modulated signal at a level of −121 db/element in the 2 KHz intermediate frequency band width setting and, with the switches in the 50 KHz band width setting, at a level of −118 db/element even though the Costas loop does not lock up under these particular conditions until the signal level per element reaches −113 db. In the event of an outage or fade during tracking, the system can be expected to realign without the necessity of returning to an acquisition mode so long as the sum output signal level exceeds the narrow band acquisition threshold by 3 db. In the particular unit tested, the system would align on a −120 db/element signal level in two alignment cycles corresponding to between 16 and 32 milliseconds depending on whether the system required only one cycle or both to align.

It is thus clear that a new phase alignment system for a self-phasing array has been provided utilizing a single time-shared processor which sequentially phase aligns each array element with a suitable reference signal. The time-shared phase alignment system can be employed to steer multiple sequential array beams toward multiple signal sources. The time-shared alignment system can steer multiple simultaneous beams from several antenna arrays or from subarrays within one array toward multiple signal sources. Additional digital registers such as 105 in the phase shift and commutation control system 79 would accommodate the additional phase shift information for the multiple beams.

In the case of multiple simultaneous wave fronts arriving from several distinct spatial directions, distinct filters would be employed in sum and sample signal convertors 65 and 67 to isolate one signal at a time for phase comparison in mixers 69 and 70 and decoding 73. The system would have utility in IFF, radar, radio and sonar communication or scanning environments and accordingly the scope of the present invention is to be limited only by that of the appended claims.

I claim:

1. A self-phasing receptor array system comprising:
   a plurality of receptor elements forming an array;
   a commutated time-shared signal processor adapted to phase align an incoming signal and a reference signal; and
   commutator means for selectively connecting at least one of said receptor elements to said signal processor to allow time sharing the processor, said time-shared signal processor comprising a radio frequency receiving stage, signal combining means, an intermediate frequency amplifying stage, a phase comparator, a lowpass filter, and phase control circuitry having an output connected to said signal combining means so as to form multiple sampled-data phase locked loops.

2. The system of claim 1 wherein each receptor element is a radio frequency antenna.

3. The system of claim 1 wherein said receptor array system is so disposed and selectively connected to provide an electronically rotatable signal seeking system.

4. The method of phase aligning a distributed receiving antenna array comprising the steps of:
   summing the individual antenna signals;
   comparing the phase of a signal from a selected one of the antennas to the phase of the sum signal;
   adjusting, in response to the said comparison, the phase at which the signal from the said selected antenna is added to the remaining antenna signals;
   electronically stepping a commutator control; and
   sequentially repeating the steps of comparing and adjusting for different selected antennas.

5. The method of claim 4 wherein the selected antenna signal is deleted from the sum of the antenna signals.

6. The method of claim 4 comprising the further step of maintaining the phase adjustment for the selected antenna constant at least until a subsequent comparison of that same antenna signal to the sum of the individual antenna signals.

7. The method of claim 6 further comprising the steps of:
   interrupting the sequentially comparing and adjusting while maintaining all the phase shifts fixed; and
   transmitting radio frequency signals on the thus phased antenna array thereby providing a transmission radiation pattern substantially the same as the reception sensitivity pattern just prior to interruption.

8. A self-phasing antenna system comprising:
   a plurality of antenna elements forming an array;
   a time-shared signal processor for providing phase alignment signals in response to incoming signals and reference signals, said signal processor being time-shared by the antenna elements;
   a plurality of variable phase shift means connected to certain of the antenna elements; and
   commutator means for sequentially connecting the processor to each said phase shift means for selectively controlling the phase shift imparted thereby, said commutator means selectively controlling the phase shift in response to commands from said time-shared signal processor.

9. The antenna system of claim 8 further comprising summation means for adding selectively phase shifted antenna signals, the summation means output forming said reference signals.

10. The antenna system of claim 8 further comprising switch means operable in synchronism with the commutator means for selectively deleting from the summation means the output of the antenna associated with the phase shift means being controlled and for supplying that antenna output as the reference signal to the time-shared processor.

11. A self-phasing antenna system comprising:
   receptor means for providing a plurality of received signals;
   means for selectively shifting the phase of each received signal;
   means for adding the selectively shifted signals;
   means for sequentially comparing the phase of individual shifted signals to the phase of the sum of the signals; and
   means responsive to the comparing means for changing the phase shift of the individual signal compared so as to diminish the difference in phase between the compared signals, the means for adding and comparing and means responsive to the comparing means all being time-shared with the receptor means.

12. The self-phasing antenna system of claim 11 wherein the responsive means comprises electronic switch means, and said means for selectively shifting the phase imparting one of several discrete phase shifts to signals passing therethrough as specified by the electrical status of the means responsive to the comparing means.

* * * * *